United States Patent
Li et al.

(10) Patent No.: US 8,477,669 B2
(45) Date of Patent: Jul. 2, 2013

(54) METHOD, DEVICE, AND SYSTEM FOR IMPLEMENTING COMMUNICATION SERVICES

(75) Inventors: Shiqian Li, Shenzhen (CN); Lun Lian, Shenzhen (CN); Fengshao Zou, Shenzhen (CN); Xun Shi, Shenzhen (CN); Yunfei Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/105,760

(22) Filed: May 11, 2011

(65) Prior Publication Data

US 2011/0211509 A1 Sep. 1, 2011

Related U.S. Application Data

(63) Continuation of application No. PCT/CN2009/072707, filed on Jul. 9, 2009.

(30) Foreign Application Priority Data

Nov. 11, 2008 (CN) .......................... 2008 1 0219051

(51) Int. Cl.
*H04B 7/00* (2006.01)
*H04W 4/00* (2009.01)
*H04M 1/00* (2006.01)

(52) U.S. Cl.
USPC ......... 370/310; 455/461; 455/554.1; 455/555

(58) Field of Classification Search
None
See application file for complete search history.

(56) References Cited

U.S. PATENT DOCUMENTS

| 7,653,081 | B2 * | 1/2010 | Cannon ......................... 370/465 |
| 2005/0276402 | A1 * | 12/2005 | Tang et al. ............... 379/114.28 |
| 2006/0025140 | A1 * | 2/2006 | Bales et al. .................... 455/445 |
| 2006/0030357 | A1 * | 2/2006 | McConnell et al. ....... 455/554.1 |
| 2007/0281669 | A1 * | 12/2007 | Jiang .......................... 455/414.1 |

FOREIGN PATENT DOCUMENTS

| CA | 2174994 A1 | 12/1996 |
| CN | 1756285 A | 4/2006 |
| CN | 101039364 A | 9/2007 |
| CN | 101076132 A | 11/2007 |
| CN | 101087336 A | 12/2007 |
| CN | 101431746 A | 5/2009 |
| CN | 101453723 A | 6/2009 |
| KR | 100811809 B1 | 3/2008 |

OTHER PUBLICATIONS

International Search Report dated Oct. 15, 2009 in connection with International Patent Application No. PCT/CN2009/072707.

* cited by examiner

*Primary Examiner* — Hassan Phillips
*Assistant Examiner* — Lonnie Sweet

(57) ABSTRACT

A method for implementing communication services includes: after receiving a call request, determining whether a user subscribes to an IP Centrex service and an intelligent network (IN) service according to the obtained subscription information of the user; if the user subscribes to the IP Centrex service and IN service, checking with an application server (AS) whether the call request is for an intra-group call; if the call request is for an intra-group call, performing corresponding service processing according to the checking result to implement discount charging on the intra-group call. By using the method of the present invention, if the user subscribes to the IP Centrex service and the IN service, no conflict occurs between the IP Centrex service and the IN service, and discount charging is implemented on the intra-group call. A network device and a mobile communication system are also provided.

10 Claims, 12 Drawing Sheets

METHOD, DEVICE, AND SYSTEM FOR IMPLEMENTING COMMUNICATION SERVICES

CROSS-REFERENCE TO RELATED APPLICATIONS

This application is a continuation of International Application No. PCT/CN2009/072707, filed on Jul. 9, 2009, which claims priority to Chinese Patent Application No. 200810219051.8, filed on Nov. 11, 2008, both of which are hereby incorporated by reference in their entireties.

TECHNICAL FIELD

The present invention relates to communication technologies, and in particular, to a method, device and system for implementing communication services.

BACKGROUND

Telecom technologies are developing constantly. As the next generation network (NGN) framework comes into existence, the ways of providing telecom services are changing, and various new services are emerging. The softswitch-based IP Centrex service and intelligent network (IN) service are emerging in response to the service requirements.

The IP Centrex service is an IP-based Centrex service. It is a value-added service that combines the flexibility of IP networks and the Centrex service on fixed networks, and provides users with functions such as intra-group call, non intra-group call, outgoing call screening, short number dialing, and attendant transfer. The following describes the method for implementing the IP Centrex service. When user A calls user B, after the softswitch domain of user A receives a call request from user A, the softswitch domain of user A forwards the call request to a corresponding application server (AS). Then, the AS accesses the service data of user B, and sends the call request of user A to the softswitch domain of user B to perform the subsequent call connection. During the preceding implementation of the IP Centrex service, if the call request is for an intra-group call, the AS that executes the IP Centrex service performs discount charging, and then performs the subsequent call connection; if the call request is for a non intra-group call, the AS that executes the IP Centrex service directly performs the subsequent call connection.

The IN service is a series of emerging services based on the intelligent network, and can implement functions such as incoming call screening, voice control, prepaid charging, and mobile virtual private network (VPN). The IN service is diversified, flexible, cost-effective, and fast, and is very popular among a large number of users. The IN service may be implemented in the following three different methods: 1. A softswitch accesses a service control point (SCP) on a conventional intelligent network; 2. A service switching point (SSP) on a conventional intelligent network accesses an AS; 3. A third party provides various IN services. The following describes the first method for implementing the IN service. In this method, the softswitch implements the service switching function (SSF), triggers the IN service, and interworks with the SCP on the conventional intelligent network through a signaling gateway; the softswitch accepts the IN call control performed by the SCP, connects the call, and interacts with users to provide the users with various IN services. It is widely known that the IN service can implement intra-group call and non intra-group call services.

With the growth of user requirements, a user may tend to subscribe to the IP Centrex service and the IN service at the same time. However, conflicts may occur when the user subscribes to both the IP Centrex service and the IN service. If the IN service is triggered, the IP Centrex service cannot be implemented, and thus the discount charging cannot be performed on the intra-group call.

SUMMARY

Embodiments of the present invention provide a method, device, and system for implementing communication services so that discount charging can be implemented on an intra-group call when a user subscribes to an IP Centrex service and an IN service.

A method for implementing communication services includes: after receiving a call request, determining whether a user subscribes to an IP Centrex service and an IN service according to obtained subscription information of the user; if the user subscribes to the IP Centrex service and IN service, checking with an As whether the call request is for an intra-group call; and if the call request is for an intra-group call, performing corresponding service processing according to the checking result to implement discount charging on the intra-group call.

Accordingly, a network device includes a determining module, a checking module, and an intra-group call processing module. The determining module is adapted to determine whether a user subscribes to an IP Centrex service and an IN service according to obtained subscription information of the user. The checking module is adapted to check with an AS whether a call request is for an intra-group call if the determining module determines that the user subscribes to the IP Centrex service and IN service. If the call request is for an intra-group call, the intra-group call processing module is adapted to perform corresponding service processing according to the checking result of the checking module to implement discount charging on the intra-group call.

Accordingly, a mobile communication system includes an AS and a network device. The AS is adapted to check whether a call request is for an intra-group call. The network device is adapted to: receive the call request, determine whether a user subscribes to an IP Centrex service and an IN service, check with the As whether the call request is for an intra-group call if the user subscribes to the IP Centrex service and IN service; and if the call request is for an intra-group call, perform corresponding service processing to implement discount charging on the intra-group call.

In the embodiments of the present invention, as seen from the preceding technical solution, the AS is checked to find out whether the call request is for an intra-group call; and if the call request is for an intra-group call, corresponding service processing is performed according to the checking result to implement discount charging on the intra-group call. Thus, if the user subscribes to the IP Centrex service and IN service, no conflict occurs between the IP Centrex service and the IN service, and discount charging can be implemented on the intra-group call.

BRIEF DESCRIPTION OF THE DRAWINGS

To make the technical solution of the present invention clearer, the accompanying drawings for illustrating the embodiments of the present invention are outlined below. Apparently, the accompanying drawings are exemplary only, and those skilled in the art can derive other drawings from such accompanying drawings or embodiments without creative efforts.

DETAILED DESCRIPTION

The present invention is hereinafter described in detail with reference to preferred embodiments and accompanying drawings.

Embodiment 1

Figure 1:
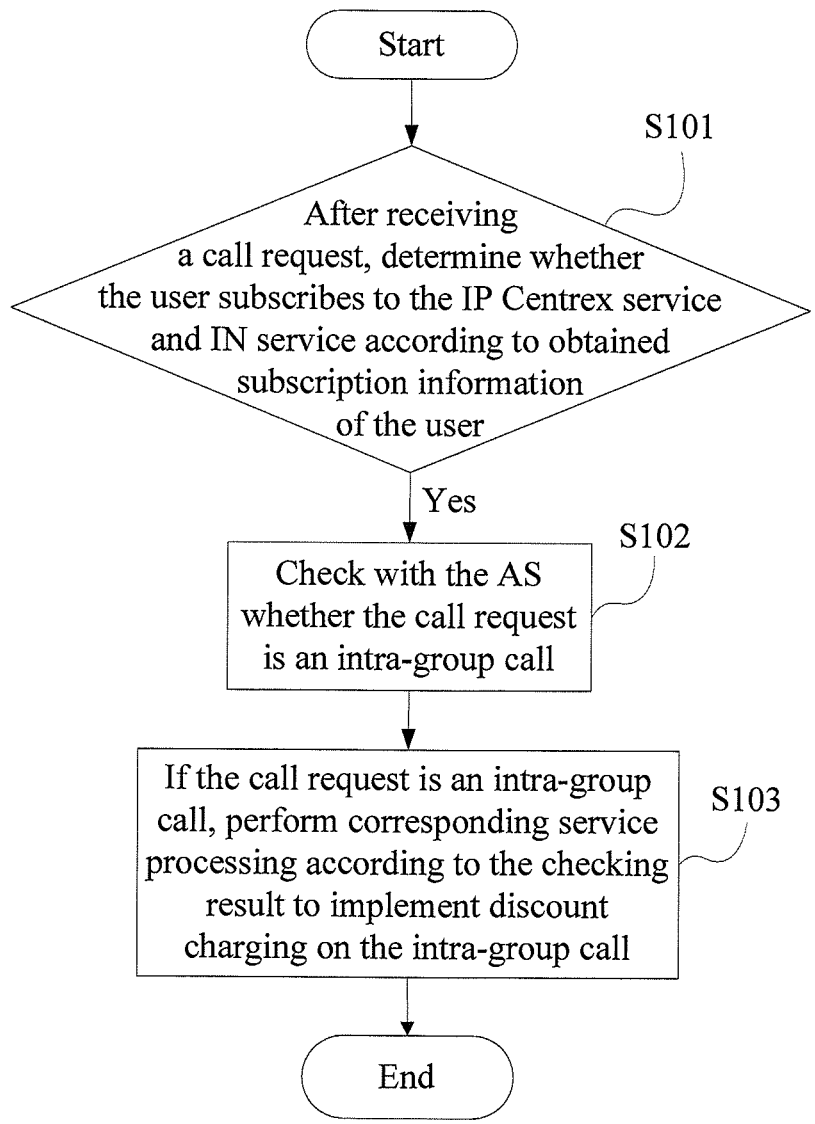
FIG. 1 is a flowchart of a method for implementing communication services according to an embodiment of the present invention.

FIG. 1 is a flowchart of a method for implementing the IP Centrex service and the IN service according to the first embodiment of the present invention. As shown in FIG. 1, the method includes: after receiving a call request, determining whether the user subscribes to the IP Centrex service and the IN service according to the obtained subscription information of the user (step S101); if the user subscribes to the IP Centrex service and the IN service, checking with the As whether the call request is for an intra-group call (step S102); and if the call request is for an intra-group call, performing corresponding service processing according to the checking result to implement discount charging on the intra-group call (step S103). Thus, if the user subscribes to the IP Centrex service and the IN service at the same time, the AS is checked to find out whether the call is an intra-group call; if the call is an intra-group call, corresponding service processing is performed according to the checking result. In this way, no conflict occurs between the IP Centrex service and the IN service. In addition, by using the corresponding service processing method, discount charging can be performed on the intra-group call when the IP Centrex service and/or the IN service is triggered.

Figure 2:
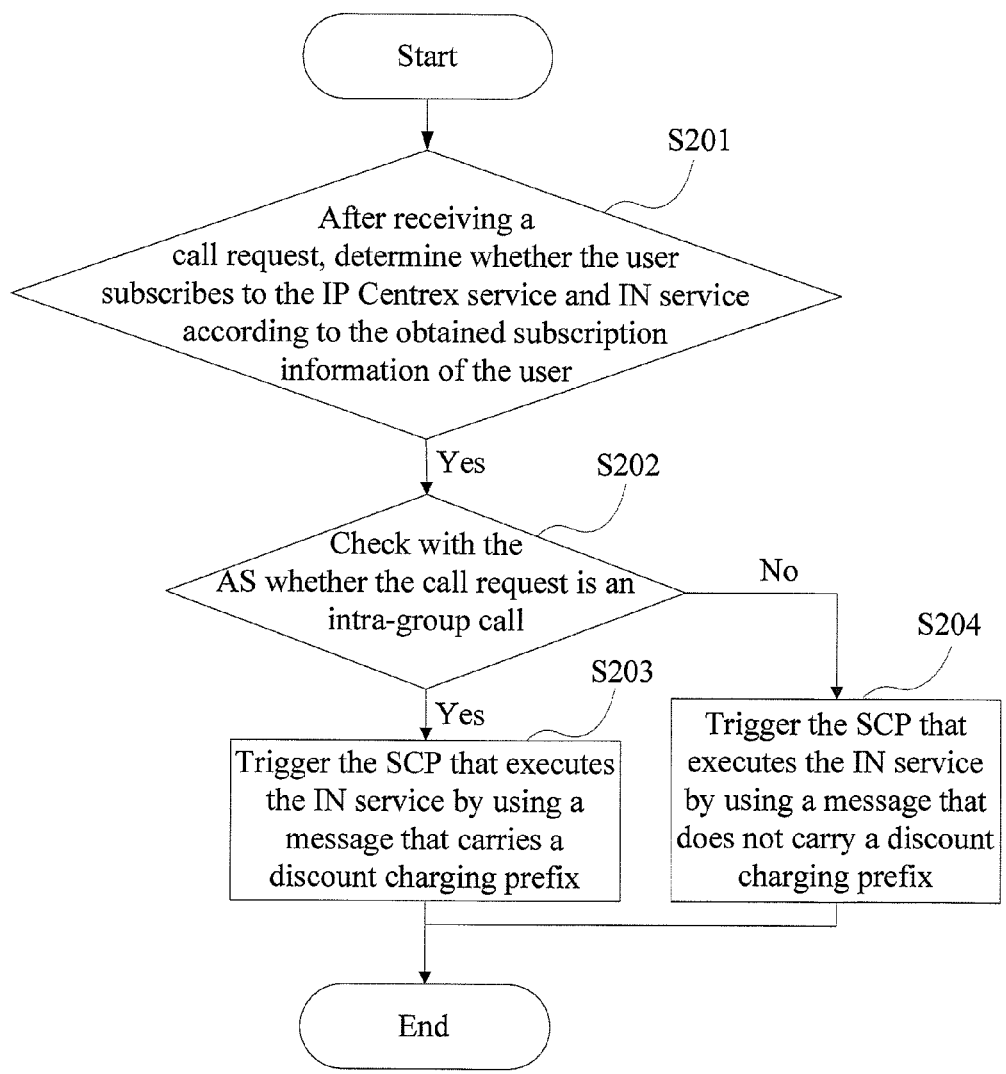
FIG. 2 is a flowchart of a method for implementing communication services according to a first embodiment of the present invention.

FIG. 2 is a flowchart of the first embodiment of a method for implementing the IP Centrex and IN services. As shown in FIG. 2, the method includes: after receiving a call request, determining whether the user subscribes to the IP Centrex service and the IN service according to the obtained subscription information of the user (step S201); if the user subscribes to the IP Centrex service and the IN service, checking with the As whether the call request is for an intra-group call (step S202); if the call request is for an intra-group call, triggering the SCP that executes the IN service by using a message that carries a discount charging prefix (step S203); if the call request is for a non intra-group call, triggering the SCP that executes the IN service by using a message that does not carry a discount charging prefix (step S204).

Figure 3:
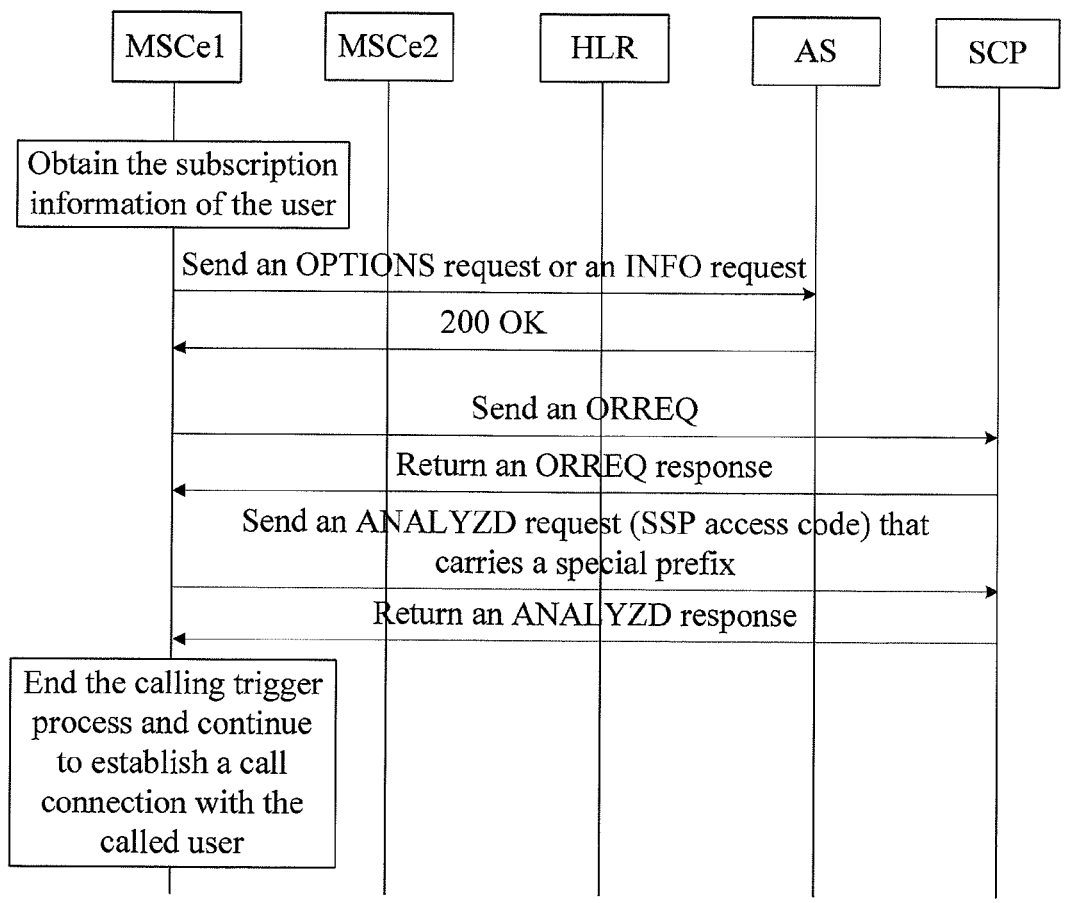
FIG. 3 illustrates a calling process of the embodiment as shown in FIG. 2.
Figure 4:
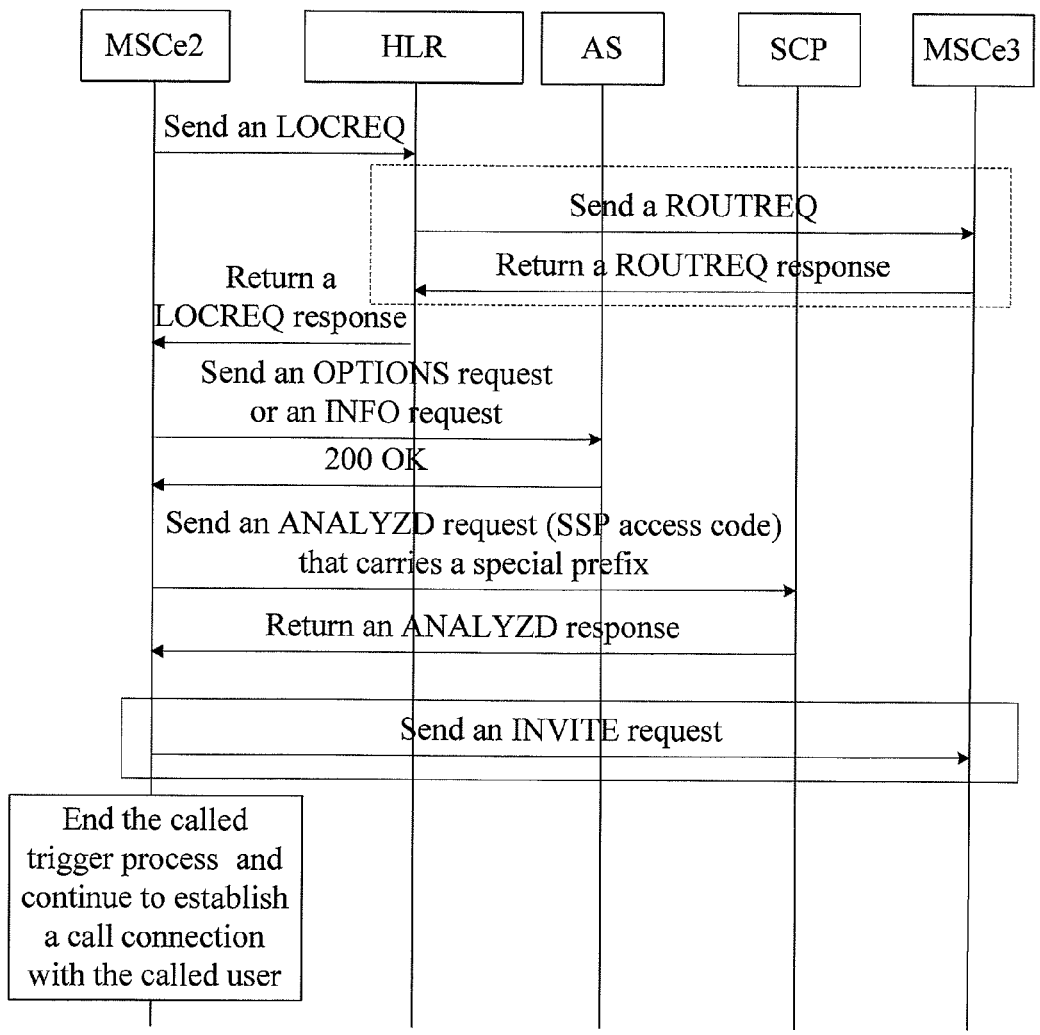
FIG. 4 illustrates a called process of the embodiment as shown in FIG. 2.

FIG. 3 and FIG. 4 illustrate the first embodiment of the method for implementing the IP Centrex service and the IN service shown in FIG. 2.

FIG. 3 illustrates a calling process shown in FIG. 2. As shown in FIG. 3, the calling process includes: The calling user initiates a call request; after receiving the call request, the mobile switching center emulation 1 (MSCe1) determines whether the calling user subscribes to the IP Centrex service and the IN service according to the obtained subscription information of the calling user. If the calling user subscribes to the IP Centrex service and the IN service, the MSCe1 checks with the AS whether the call request is for an intra-group call by sending an OPTIONS request or an INFO request to the AS; the MSCe1 receives from the AS a 200 for OPTIONS response or a 200 for INFO response (200 OK) that carries a checking result indicating whether the call request is for an intra-group call; after receiving the checking result, the MSCe1 sends an origination request (ORREQ) to the SCP; after receiving the ORREQ, the SCP determines whether the calling user has calling rights, and then returns an ORREQ response to the MSCe1; after receiving the ORREQ response, if the call request is for an intra-group call, the MSCe1 triggers the SCP that executes the IN service by using an ANALYZD request (SSP access code) that carries a special prefix, so that the SCP can perform discount charging; if the call request is for a non intra-group call, the MSCe1 triggers the SCP that executes the IN service to perform subsequent service control by using an ANALYZD request that does not carry a special prefix; the SCP returns an ANALYZD response to the MSCe1 to indicate that the MSCe1 can establish a service connection. Then, the calling trigger process ends, and the MSCe1 continues to establish a call connection with the called user.

FIG. 4 illustrates a called process shown in FIG. 2. As shown in FIG. 4, the called process includes: The MSCe2 sends a location request (LOCREQ) to the home location register (HLR). If the calling user and the called user are located in the same service area, the HLR returns the subscription information of the called user in the LOCREQ response; if the calling user and the called user are located in different service areas, the HLR sends a route request (ROUTREQ) to the MSCe3, requesting the MSCe3 to process and allocate corresponding route information; the MSCe3 accepts the ROUTREQ and returns a ROUTREQ response to the HLR; the HLR returns the subscription information of the called user in the LOCREQ response. The MSCe2 determines whether the called user subscribes to the IP Centrex service and the IN service according to the subscription information of the called user; if the called user subscribes to the IP Centrex service and the IN service, the MSCe2 sends an OPTIONS request or an INFO request to the AS to check whether the call request is for an intra-group call; the MSCe2 receives from the AS a 200 for OPTIONS response or a 200 for INFO response (200 OK) that carries the checking result; if the call request is for an intra-group call, the MSCe2 triggers the SCP by using an ANALYZD request (SSP access code) that carries a special prefix, so that the SCP may perform discount charging; if the call request is for a non intra-group call, the MSCe2 triggers the SCP by using an ANALYZD request that does not carry a special prefix, and the SCP performs subsequent service control; the SCP returns an ANALYZD response to the MSCe2 to indicate that the MSCe2 can establish a service connection. If the calling user and the called user are located in different service areas, the MSCe2 sends an INVITE request to the MSCe3, requesting to establish a service connection. Then, the called trigger process ends.

In this embodiment, if the calling user and the called user subscribe to only the IN service or the IP Centrex service, the process is performed according to a corresponding IN service logic or IP Centrex service logic.

Embodiment 2

Figure 5:
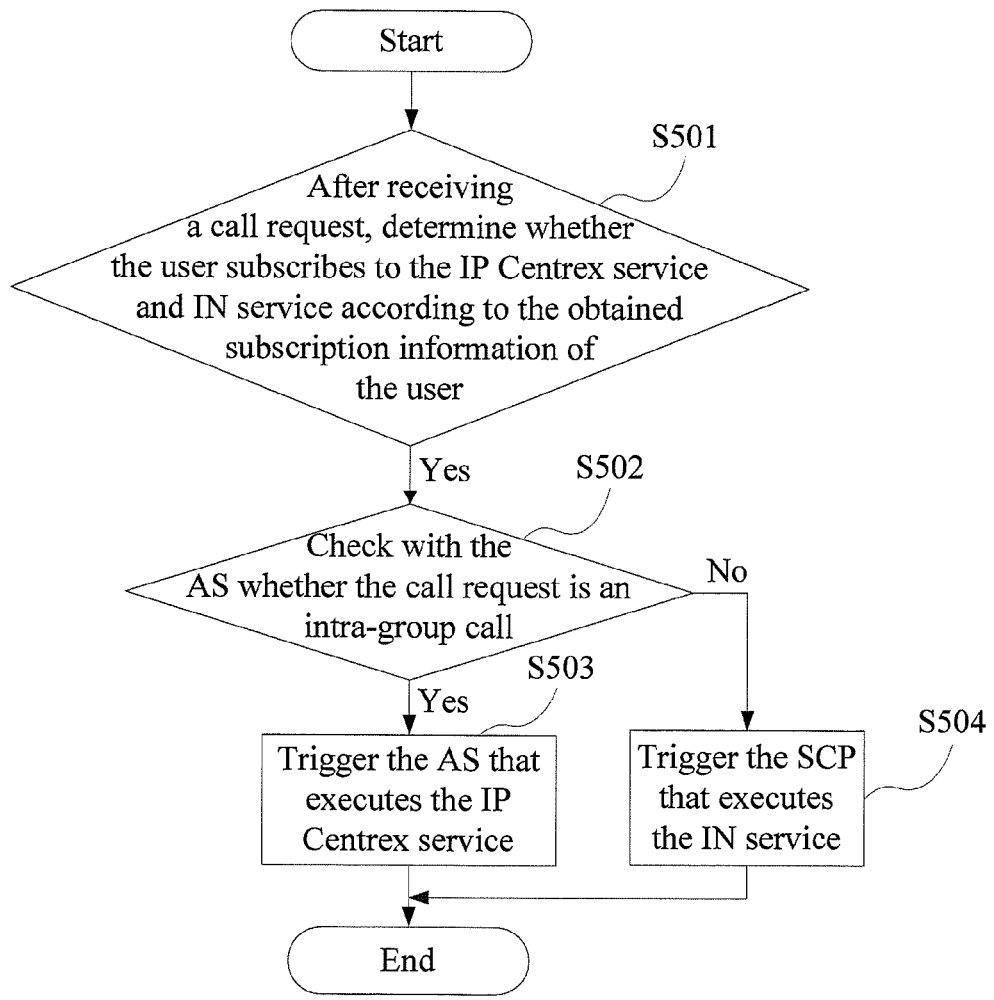
FIG. 5 is a flowchart of a method for implementing communication services according to a second embodiment of the present invention.

FIG. 5 is a flowchart of the second embodiment of a method for implementing the IP Centrex and IN services. As shown in FIG. 5, the method includes: after receiving a call request, determining whether the user subscribes to the IP Centrex service and the IN service according to the obtained subscription information of the user (step S501); if the user subscribes to the IP Centrex service and the IN service, checking with the As whether the call request is for an intra-group call (step S502); if the call request is for an intra-group call, triggering the AS that executes the IP Centrex service (step S503); if the call request is for a non intra-group call, triggering the SCP that executes the IN service (step S504).

Figure 6:
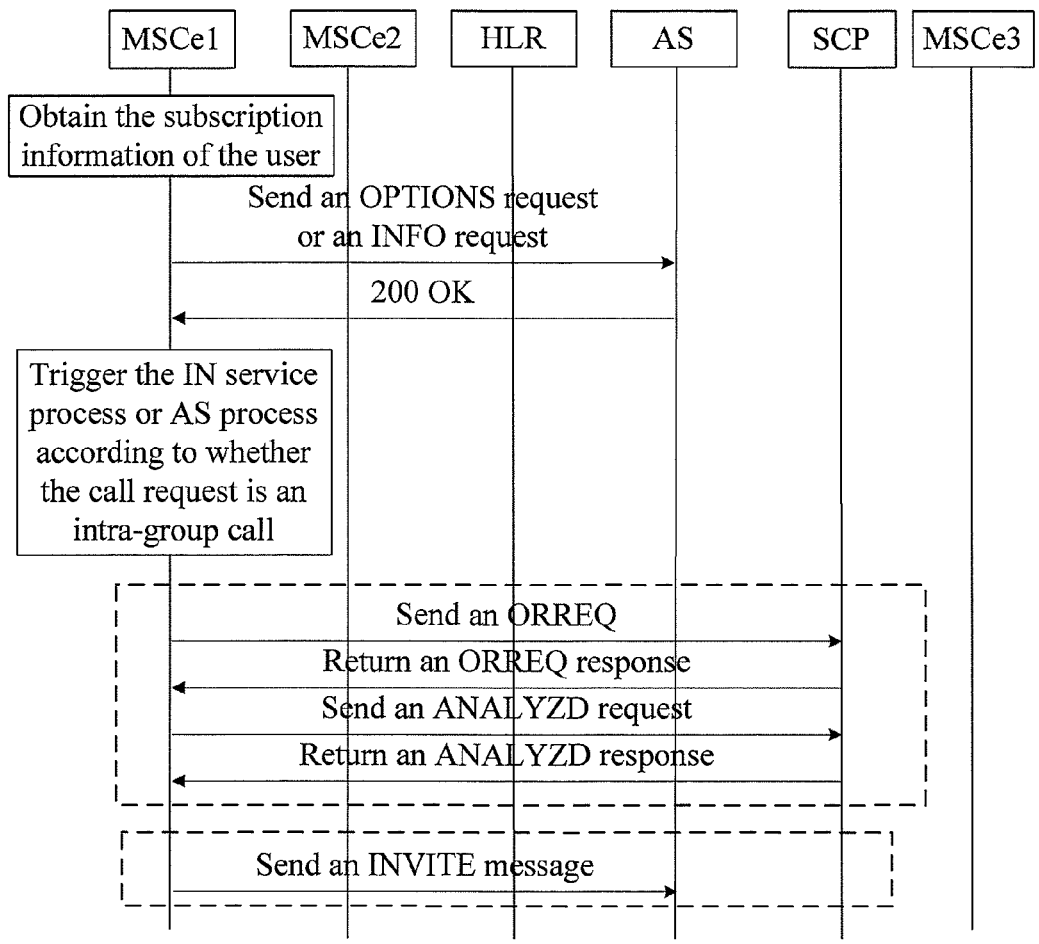
FIG. 6 illustrates a calling process of the embodiment as shown in FIG. 5.
Figure 7:
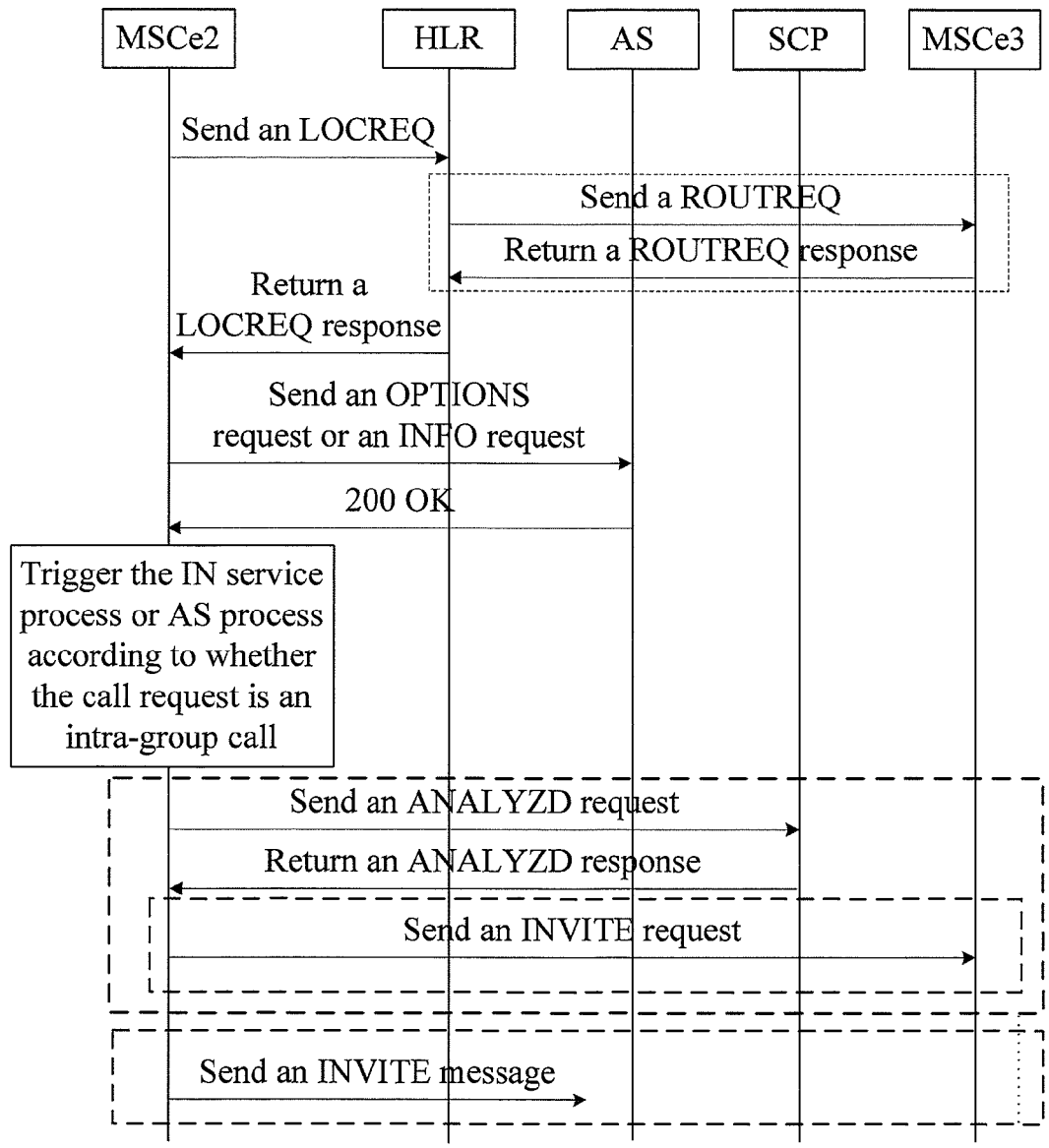
FIG. 7 illustrates a called process of the embodiment as shown in FIG. 5.

FIG. 6 and FIG. 7 illustrate the second embodiment of the method for implementing the IP Centrex service and the IN service shown in FIG. 5.

FIG. 6 illustrates a calling process shown in FIG. 5. As shown in FIG. 6, the calling process includes: The calling user initiates a call request; after receiving the call request, the MSCe1 determines whether the calling user subscribes to the IP Centrex service and the IN service according to the obtained subscription information of the calling user. If the calling user subscribes to the IP Centrex service and the IN service, the MSCe1 sends an OPTIONS request or an INFO request to the AS to check whether the call request is for an intra-group call; the MSCe1 receives from the AS a 200 for OPTIONS response or a 200 for INFO response (200 OK) that carries a checking result indicating whether the call request is for an intra-group call; if the call request is for a non intra-group call, the MSCe1 sends an ORREQ to the SCP; after receiving the ORREQ, the SCP determines whether the calling user has calling rights, and returns an ORREQ response to the MSCe1; after receiving the ORREQ response, the MSCe1 sends an ANALYZD request to trigger the SCP; the SCP returns an ANALYZD response to the MSCe1 to indicate that the MSCe1 can establish a service connection. Then, the calling trigger process ends. If the call request is for an intra-group call, the MSCe1 sends an INVITE message to trigger the AS, requesting the AS to perform subsequent service processing. Then, the calling trigger process ends. The MSCe1 continues to connect the call to the called user.

FIG. 7 illustrates a called process shown in FIG. 5. As shown in FIG. 7, the called process includes: The MSCe2 sends a LOCREQ to the HLR. If the calling user and the called user are located in the same service area, the HLR returns the subscription information of the called user in the LOCREQ response; if the calling user and the called user are located in different service areas, the HLR sends a ROUTREQ to the MSCe3, requesting the MSCe3 to process and allocate corresponding route information; the MSCe3 accepts the ROUTREQ and returns a ROUTREQ response to the HLR; the HLR returns the subscription information of the called user in the LOCREQ response. The MSCe2 determines whether the called user subscribes to the IP Centrex service and the IN service according to the subscription information of the called user; if the called user subscribes to the IP Centrex service and the IN service, the MSCe2 sends an OPTIONS request or an INFO request to the AS to check whether the call request is for an intra-group call; the MSCe2 receives from the AS a 200 for OPTIONS response or a 200 for INFO response (200 OK) that carries a checking result; if the call request is for a non intra-group call, the MSCe2 sends an ANALYZD request to trigger the SCP; the SCP returns an ANALYZD response to the MSCe2 to indicate that the MSCe2 can establish a service connection. If the calling user and the called user are located in different service areas, the MSCe2 sends an INVITE request to the MSCe3, requesting to establish a service connection; if the call request is for an intra-group call, the MSCe2 sends an INVITE message to the trigger the AS to perform subsequent service control. Then, the called trigger process ends.

In this embodiment, if the calling user and the called user subscribe to only the IN service or the IP Centrex service, the process is performed according to a corresponding IN service logic or IP Centrex service logic.

Embodiment 3

Figure 8:
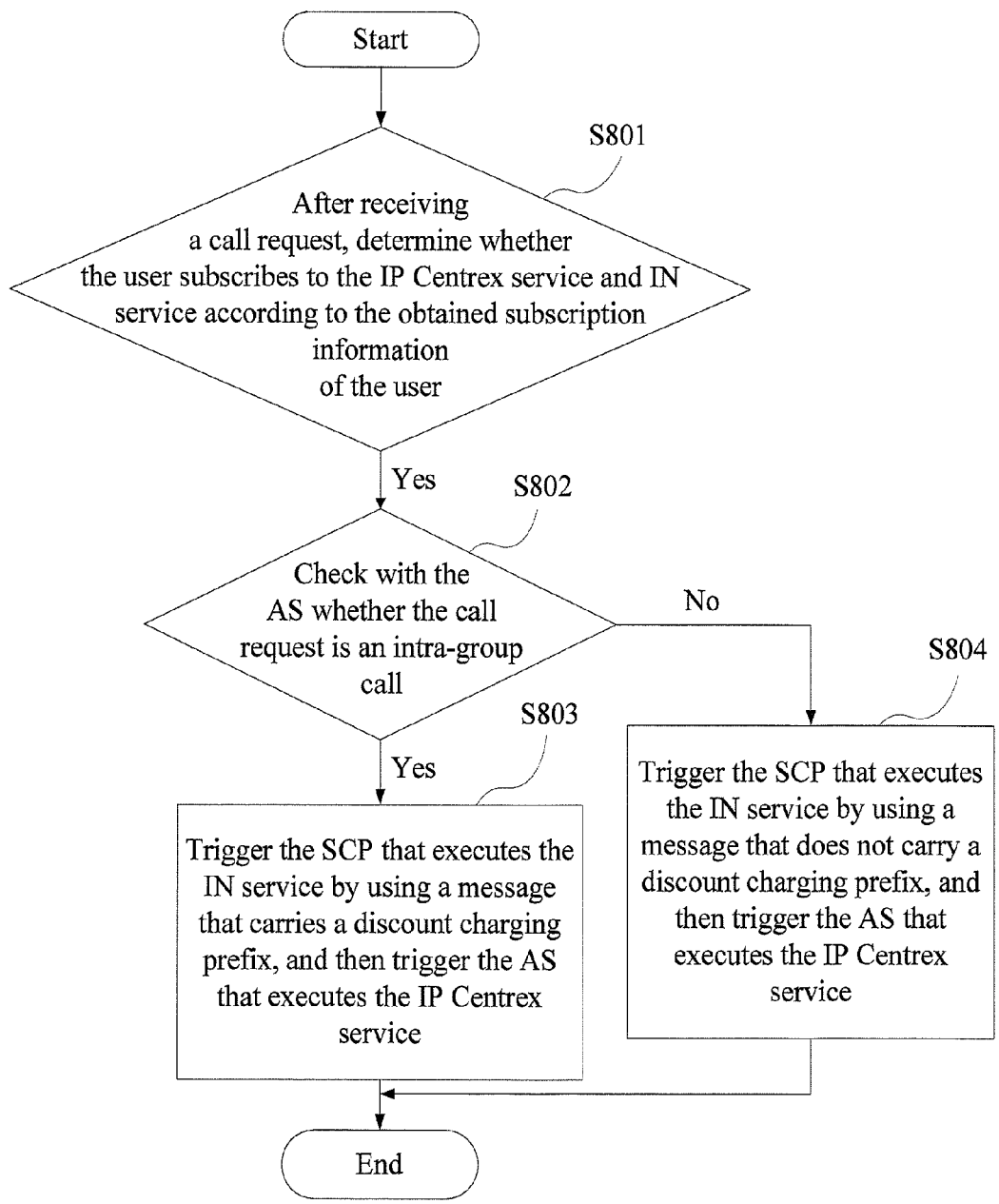
FIG. 8 is a flowchart of a method for implementing communication services according to a third embodiment of the present invention.

FIG. 8 is a flowchart of the third embodiment of a method for implementing the IP Centrex and IN services. As shown in FIG. 8, the method includes: after receiving a call request, determining whether the user subscribes to the IP Centrex service and the IN service according to the obtained subscription information of the subscriber (step S801); if the user subscribes to the IP Centrex service and the IN service, checking with the As whether the call request is for an intra-group call (step S802); if the call request is for an intra-group call, triggering the SCP that executes the IN service by using a message that carries a discount charging prefix (step S803); if the call request is for a non intra-group call, triggering the SCP that executes the IN service by using a message that does not carry a discount charging prefix (step S804).

Figure 9:
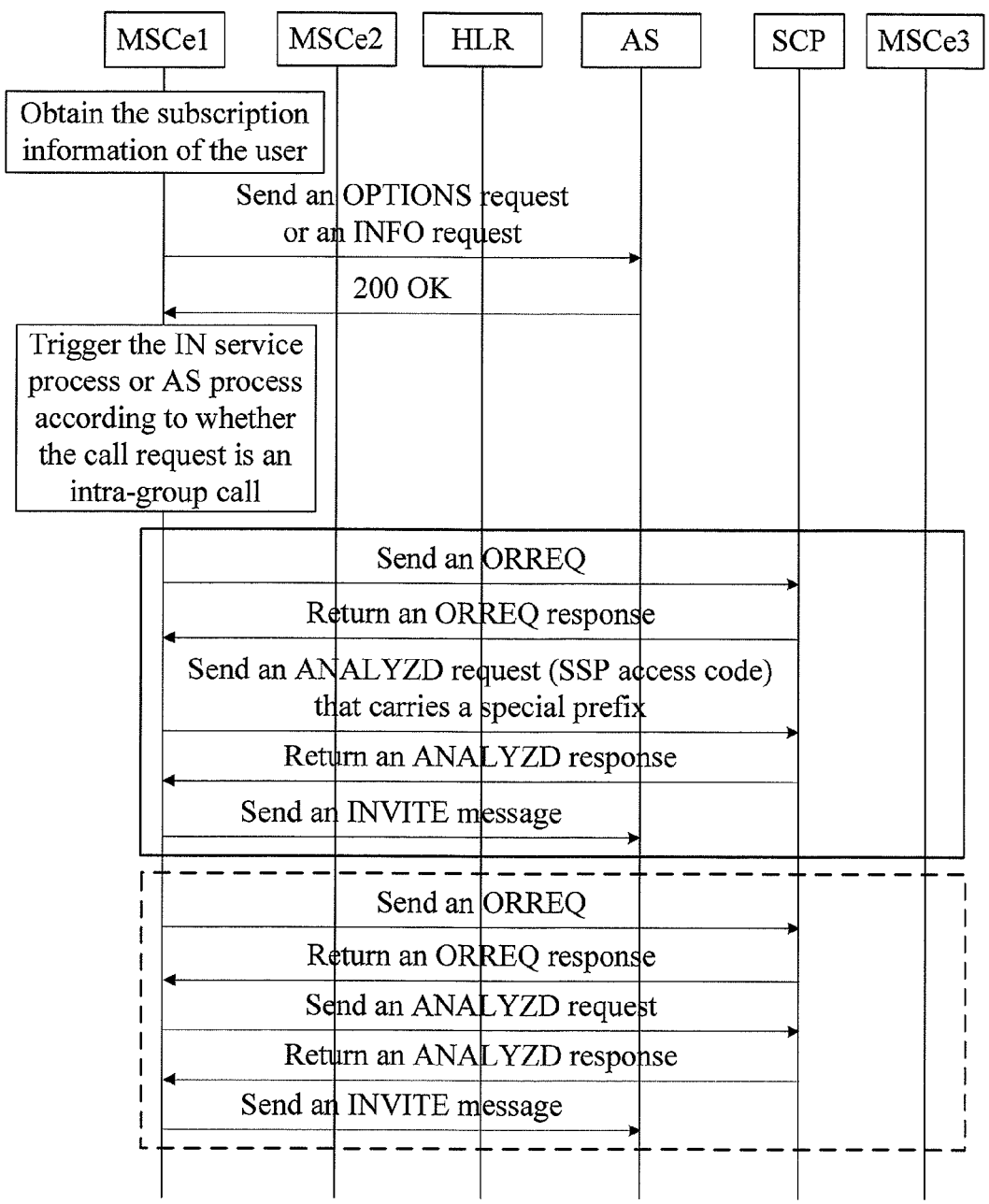
FIG. 9 illustrates a calling process of the embodiment as shown in FIG. 8.

FIG. 9 illustrates the third embodiment of the method for implementing the IP Centrex service and the IN service shown in FIG. 8.

FIG. 9 illustrates a calling process shown in FIG. 8. As shown in FIG. 9, the calling process includes: The calling user initiates a call request; after receiving the call request, the MSCe1 determines whether the calling user subscribes to the IP Centrex service and the IN service according to the obtained subscription information of the calling user. If the calling user subscribes to the IP Centrex service and the IN service, the MSCe1 sends an OPTIONS request or an INFO request to the AS to check whether the call request is for an intra-group call; the MSCe1 receives from the AS a 200 for OPTIONS response or a 200 for INFO response (200 OK) that carries a checking result indicating whether the call request is for an intra-group call; if the call request is for an intra-group call, the MSCe1 stores a record of connecting the intra-group call to the AS, and then sends an ORREQ to the SCP; after receiving the ORREQ, the SCP determines whether the calling user has calling rights, and returns an ORREQ response to the MSCe1; after receiving the ORREQ response, the MSCe1 triggers the SCP to perform discount charging by using an ANALYZD request (SSP access code) that carries a special prefix; the SCP returns an ANALYZD response to the MSCe1 to indicate that the MSCe1 can establish a service connection; after receiving the ANALYZD response, the MSCe1 sends an INVITE message according to the record of connecting the intra-group call to the AS to trigger the AS to perform subsequent service control. If the call request is for a non intra-group call, the MSCe1 stores the record of connecting the non intra-group call to the AS, and then sends an ORREQ to the SCP; after receiving the ORREQ, the SCP determines whether the calling user has calling rights, and then returns an ORREQ response to the MSCe1; after receiving the ORREQ response, the MSCe1 triggers the SCP by using an ANALYZD request that does not carry a special prefix to perform service processing; the SCP returns an ANALYZD response to the MSCe1 to indicate that the MSCe1 can connect the call; after receiving the ANALYZD response, the MSCe1 sends an INVITE message according to the record of connecting the intra-group call to the AS to trigger the AS to perform subsequent service control. Then, the calling trigger process ends, and the MSCe1 continues to establish a call connection with the called user. In this embodiment, the called trigger process is similar to the calling trigger process, and is not further described.

In this embodiment, if the calling user and the called user subscribe to only the IN service or the IP Centrex service, the process is performed according to a corresponding IN service logic or IP Centrex service logic.

Embodiment 4

Figure 10:
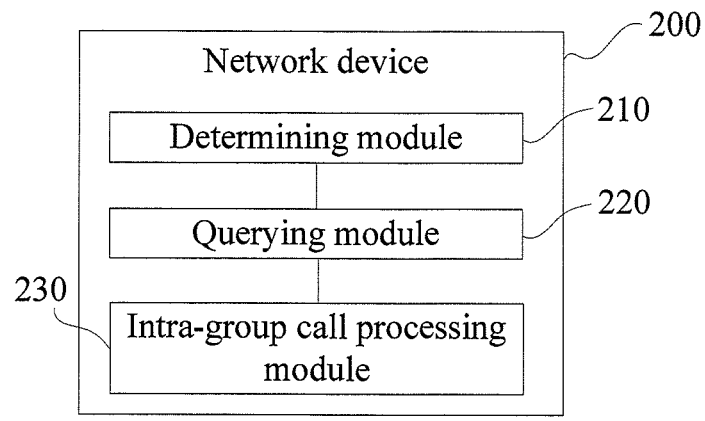
FIG. 10 is a block diagram of a network device according to an embodiment of the present invention.

FIG. 10 is a block diagram of a network device 200 in an embodiment of the present invention. The network device 200 includes a determining module 210, a checking module 220, and an intra-group call processing module 230. The determining module 210 is adapted to determine whether the user subscribes to the IP Centrex service and the IN service according to the obtained subscription information. The checking module 220 is adapted to check with the As whether the call request is for an intra-group call if the determining module 210 determines that the user subscribes to the IP Centrex service and IN service. The intra-group call processing module 230 is adapted to perform corresponding service processing according to the checking result of the checking module 220 if the call request is for an intra-group call to implement discount charging on the intra-group call. Thus, after the determining module 210 of the network device 200 determines that the user subscribes to the IP Centrex service and the IN service, the checking module 220 checks with the AS whether the call request is for an intra-group call; if the call request is for an intra-group call, the intra-group call processing module 230 performs corresponding service processing according to the checking result of the checking module 220. In this way, no conflict occurs between the IP Centrex service and the IN service, and the discount charging is implemented on the intra-group call.

Embodiment 5

Figure 11:
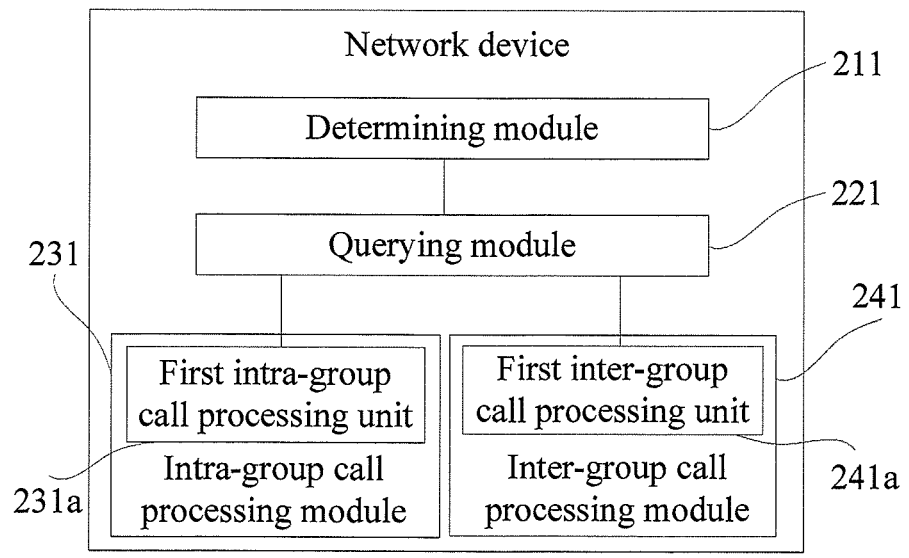
FIG. 11 is a block diagram of a network device according to a first embodiment.

FIG. 11 is a block diagram of a network device in the first embodiment of the present invention. As shown in FIG. 11, the network device includes a determining module 211, a checking module 221, an intra-group call processing module 231, and a non intra-group call processing module 241. The determining module 211 and the checking module 221 are the same as the determining module 210 and the checking module 220 respectively. The intra-group call processing module 231 includes a first intra-group call processing unit 231a. The first intra-group call processing unit 231a is adapted to trigger the SCP that executes the IN service by using a message that carries a discount charging prefix if the call request is for an intra-group call. The non intra-group call processing module 241 is adapted to perform corresponding service processing according to the checking result of the checking module 221 if the call request is for a non intra-group call. The non intra-group call processing module 241 includes a first non intra-group call processing unit 241a. The first non intra-group call processing unit 241a is adapted to trigger the SCP that executes the IN service by using a message that does not carry a discount charging prefix if the call request is for a non intra-group call. In this embodiment, the message for triggering the SCP that executes the IN service is an ANALYZD request.

Embodiment 6

Figure 12:
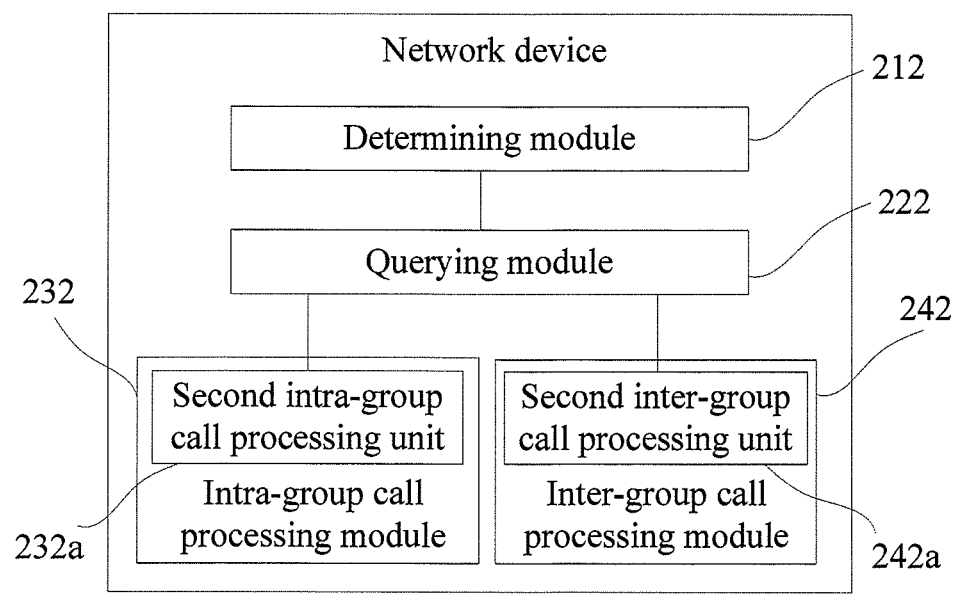
FIG. 12 is a block diagram of the network device according to a second embodiment.

FIG. 12 is a block diagram of a network device in the second embodiment of the present invention. As shown in FIG. 11, the network device includes a determining module 212, a checking module 222, an intra-group call processing module 232, and a non intra-group call processing module 242. The determining module 212 and the checking module 222 are the same as the determining module 210 and the checking module 210 respectively. The intra-group call processing module 232 includes a second intra-group call processing unit 232a. The second intra-group call processing unit 232a is adapted to trigger the AS that executes the IP Centrex service if the call request is for an intra-group call. The non intra-group call processing module 242 is adapted to perform corresponding service processing according to the checking result of the checking module 222 if the call request is for a non intra-group call. The non intra-group call processing module 242 includes a second non intra-group call processing unit 242a. The second non intra-group call processing unit 242a is adapted to trigger the SCP that executes the IN service if the call request is for a non intra-group call.

Embodiment 7

Figure 13:
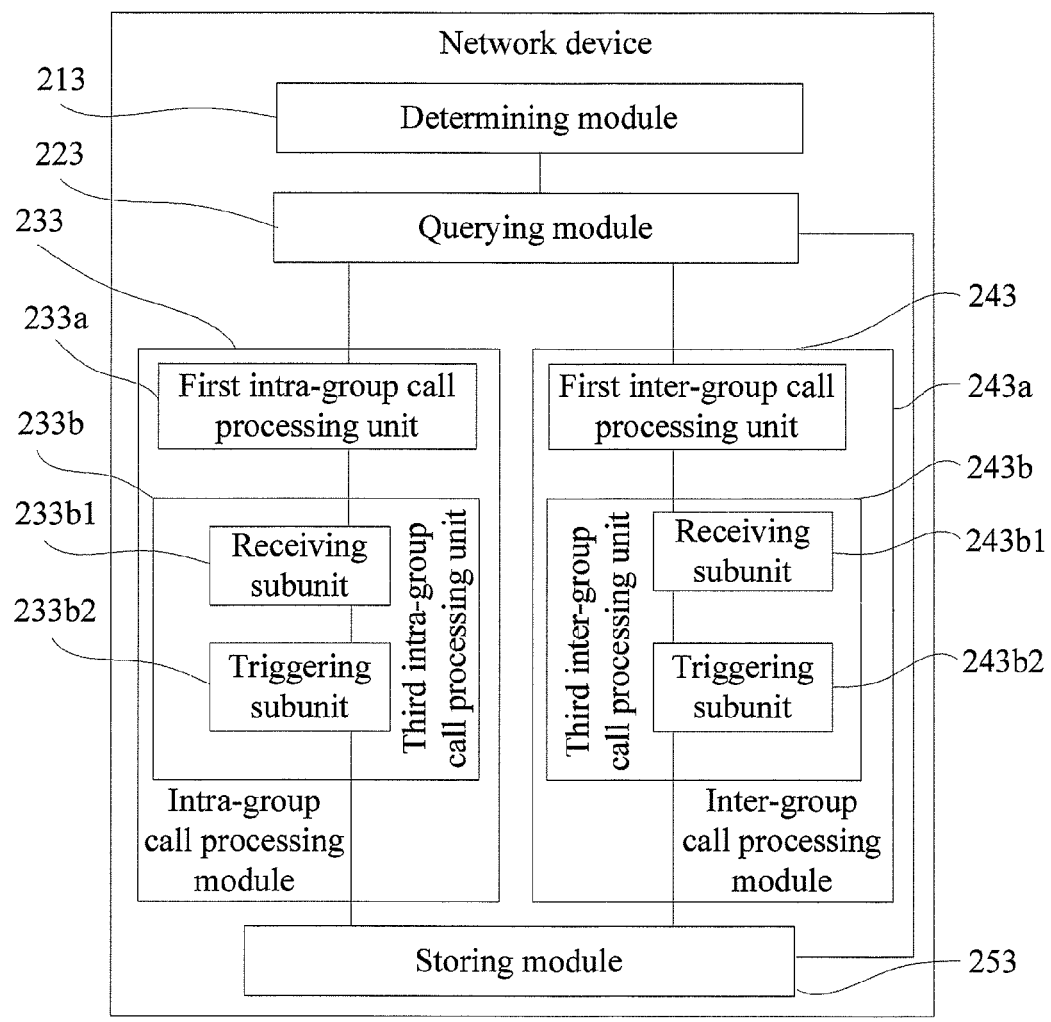
FIG. 13 is a block diagram of the network device according to a third embodiment.

FIG. 13 is a block diagram of a network device in the third embodiment of the present invention. As shown in FIG. 13, the network device includes a determining module 213, a checking module 223, an intra-group call processing module 233, a non intra-group call processing module 243, and a storing module 253. The determining module 213 and the checking module 223 are the same as the determining module 210 and the checking module 220 respectively. The storing module 253 is adapted to store a record of connecting a call to the AS when the determining module 213 determines that the user subscribes to the IP Centrex service and IN service. The intra-group call processing module 233 includes a first intra-group call processing unit 233a and a third intra-group call processing unit 233b. The first intra-group call processing unit 233a is adapted to trigger the SCP that executes the IN service by using a message that carries a discount charging prefix if the call request is for an intra-group call. The third intra-group call processing unit 233b is adapted to trigger the AS that executes the IP Centrex service after the first intra-group call processing unit 233a triggers the SCP that executes the IN service by using the message that carries a discount charging prefix. The third intra-group call processing unit 233b includes a receiving subunit 233b1 and a triggering subunit 233b2. The receiving subunit 233b1 is adapted to receive an IN service trigger response returned from the SCP.

The triggering subunit 233b2 is adapted to trigger the AS that executes the IP Centrex service according to the record of connecting a call to the AS after the receiving subunit 233b1 receives the IN service trigger response returned from the SCP. The non intra-group call processing module 243 is adapted to perform corresponding service processing according to the checking result of the checking module 223 if the call request is for a non intra-group call. The non intra-group call processing module 243 includes a first non intra-group call processing unit 243a and a third non intra-group call processing unit 243b. The first non intra-group call processing unit 243a is adapted to trigger the SCP that executes the IN service by using a message that does not carry a discount charging prefix if the call request is for a non intra-group call. The third non intra-group call processing unit 233b is adapted to trigger the AS that executes the IP Centrex service after the first non intra-group call processing unit 243a triggers the SCP that executes the IN service by using the message that does not carry a discount charging prefix. The third intra-group call processing unit 233b includes a receiving subunit 243b1 and a triggering subunit 243b2. The receiving subunit 243b1 is adapted to receive an IN service trigger response returned from the SCP. The triggering subunit 243b2 is adapted to trigger the AS that executes the IP Centrex service according to the record of connecting a call to the AS after the receiving subunit 233b1 receives the IN service trigger response returned from the SCP. In this embodiment, the message for triggering the SCP that executes the IN service is an ANALYZD request.

In the network device provided in the fifth embodiment, the sixth embodiment, or the seventh embodiment, the checking module 221/222/223 sends an OPTIONS request or an INFO request to check whether the call request is for an intra-group call.

Embodiment 8

Figure 14:
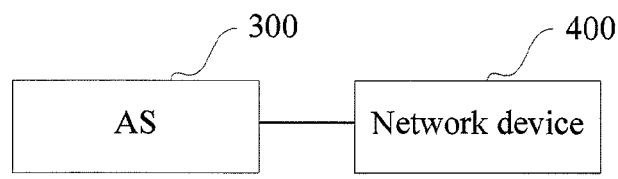
FIG. 14 is a schematic diagram illustrating a mobile communication system according to an embodiment of the present invention.

FIG. 14 is a schematic diagram illustrating a mobile communication system in an embodiment of the present invention. As shown in FIG. 14, the mobile communication system includes a network device 400 and an AS 300. The AS 300 is adapted to provide checking result indicating whether a call request is for an intra-group call. The network device 400 is adapted to: receive the call request, determine whether the user subscribes to the IP Centrex service and the IN service; if the user subscribes to the IP Centrex service and IN service, check with the As whether the call request is for an intra-group call; if the call request is for an intra-group call, perform corresponding service processing according to the checking result to implement discount charging on the intra-group call. Thus, if the checking result returned by the AS is an intra-group call, the mobile communication system performs corresponding service processing according to the checking result. In this way, no conflict occurs between the IP Centrex service and the IN service. In addition, the discount charging may be performed on the intra-group call when the IP Centrex service and/or the IN service is triggered. In this embodiment, the network device 400 may be a mobile switching center (MSC).

Although the present invention has been described through some preferred embodiments, the invention is not limited to such embodiments. Any modification or equivalent combination made without departing from the principle of the present invention should fall within the scope of the present invention.

What is claimed is:

1. A method for implementing communication services for use in a Mobile Switch Center (MSC) in a mobile communication system, the method comprising:
after receiving a call request initiated by a user, determining whether the user subscribes to an IP Centrex service and an intelligent network (IN) service according to obtained subscription information of the user;
if the user subscribes to the IP Centrex service and the IN service, checking with an application server (AS) whether the call request is for an intra-group call and storing a record of connecting the call to the AS; and
if the call request is for an intra-group call, triggering a service control point (SCP) that executes the IN service by using a message that carries a discount charging prefix, receiving an IN service trigger response from the SCP, and triggering the AS that executes the IP Centrex service according to the record of connecting the call to the AS.

2. The method of claim 1, further comprising:
if the call request is for a non intra-group call, triggering the SCP that executes the IN service by using a message that does not carry a discount charging prefix.

3. The method of claim 2, wherein after triggering the SCP that executes the IN service by using a message that does not carry a discount charging prefix, the method further comprises:
receiving an IN service trigger response from the SCP; and
triggering the AS that executes the IP Centrex service according to the record of connecting the call to the AS.

4. The method of claim 1, wherein the step of checking with the AS whether the call request is for an intra-group call comprises: sending an OPTIONS request or an INFO request to the AS to check whether the call request is for an intra-group call.

5. The method of claim 1, wherein the message for triggering the SCP that executes the IN service is an ANALYZD request.

6. A Mobile Switch Center (MSC), comprising:
a receiver, adapted to receive a call request initiated by a user;
a determining module, adapted to determine whether the user subscribes to an IP Centrex service and an intelligent network (IN) service according to obtained subscription information of the user;
a checking module, adapted to check with an application server (AS) whether a call request is for an intra-group call when the determining module determines that the user subscribes to the IP Centrex service and the IN service;
a storing module adapted to store a record of connecting the call to the AS when the determining module determines that the user subscribes to the IP Centrex service and the IN service; and
an intra-group call processing module, adapted to trigger a service control point (SCP) that executes the IN service by using a message that carries a discount charging prefix if the call request is for an intra-group call, receive an IN service trigger response from the SCP, and trigger the AS that executes the IP Centrex service according to the record of connecting the call to the AS.

7. The MSC of claim 6, farther comprising:
a non intra-group call processing module, adapted to perform corresponding service processing if the call request is for a non intra-group call.

8. The MSC of claim 7, wherein the non intra-group call processing module comprises:

a first non intra-group call processing unit, adapted to trigger the SCP that executes the IN service by using a message that does not carry a discount charging prefix if the call request is for a non intra-group call.

9. The MSC of claim 8, wherein the non intra-group call processing module further comprises:

a third non intra-group call processing unit, adapted to trigger the AS that executes the IP Centrex service after the first non intra-group call processing unit triggers the SCP that executes the IN service by using a message that does not carry a discount charging prefix if the call request is for a non intra-group call.

10. A mobile communication system, comprising:

an application server (AS) adapted to provide checking result indicating whether a call request is for an intra-group call; and a Mobile Switch Center (MSC) comprising:

a receiver, adapted to receive a call request initiated by a user;

a determining module, adapted to determine whether the user subscribes to an IP Centrex service and an intelligent network (IN) service according to obtained subscription information of the user;

a checking module, adapted to check with an application server (AS) whether a call request is for an intra-group call when the determining module determines that the user subscribes to the IP Centrex service and the IN service;

a storing module adapted to store a record of connecting the call to the AS when the determining module determines that the user subscribes to the IP Centrex service and the IN service; and an intra-group call processing module, adapted to trigger a service control point (SCP) that executes the IN service by using a message that carries a discount charging prefix if the call request is for an intra-group call, receive and IN service trigger response from the SCP, and trigger the AS that executes the IP Centrex service according to the record of connecting the call to the AS.

* * * * *